Figure 1:
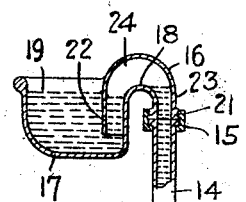
Figure 1:
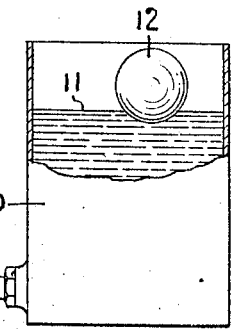

April 28, 1925.

G. A. HATTON

WATER SUPPLY SYSTEM

Filed Jan. 23, 1925

1,535,154

INVENTOR
Guerdon A. Hatton
By Kay, Totten & Martin
Attorneys.

Patented Apr. 28, 1925.

1,535,154

UNITED STATES PATENT OFFICE.

GUERDON A. HATTON, OF NEW CASTLE, PENNSYLVANIA.

WATER-SUPPLY SYSTEM.

Application filed January 23, 1925. Serial No. 4,265.

*To all whom it may concern:*

Be it known that I, GUERDON A. HATTON, a citizen of the United States, and a resident of New Castle, in the county of Lawrence and State of Pennsylvania, have invented a new and useful Improvement in Water-Supply Systems; and I do hereby declare the following to be a full, clear, and exact description thereof.

This invention relates to water supply systems for stables and the like, and is in part a continuation of my application, Serial No. 643,963, filed June 7, 1923.

In stable water supply systems provided with a main reservoir which controls the water level in a plurality of water bowls, a great deal of difficulty is experienced through water from one bowl or group of bowls flowing back into the feeding pipes, carrying dirt with it, when the level of the water in one bowl is lowered below the water level of another bowl. The dirt carried back into the feeding pipes blocks them and necessitates the tearing down of a large part of the system in order to clean out the feeding pipes. Furthermore, a back flow of even a small quantity of water may be objectionable since if an animal is diseased, it is highly essential that water from that animal's bowl shall not find its way into the supply pipe and thence to the other bowls.

Various means have been employed to overcome the objections referred to. For instance, check valves have been employed to prevent back-flow. In other systems valves have been placed in the bowl so that they would be opened to permit inflow of water when an animal attempted to drink. In still other installations a separate tank has been provided for each bowl.

The general object of this invention is to provide a cheap, simple and efficient water supply apparatus in conjunction with stable water systems, provided with means for controlling the flow of water from the main reservoir into it and for preventing the flow of water from the water bowl toward the main reservoir.

A further object of the invention is the provision of a water bowl, having means for controlling the flow of water into it, made integral with the water container.

These objects are accomplished by providing a conduit with which is associated an inverted U-pipe or goose neck, one leg of which may extend down into the container below the normal water level thereof, and the U-pipe being preferably so constructed that the cross sectional area of the bent portion is greater than the cross sectional area of either of the legs, and forming on the end of the U-pipe outside of the container means for attaching it to a feed pipe.

These and other objects of the invention will be more clearly understood from the following detailed description and accompanying drawings.

Figure 2:
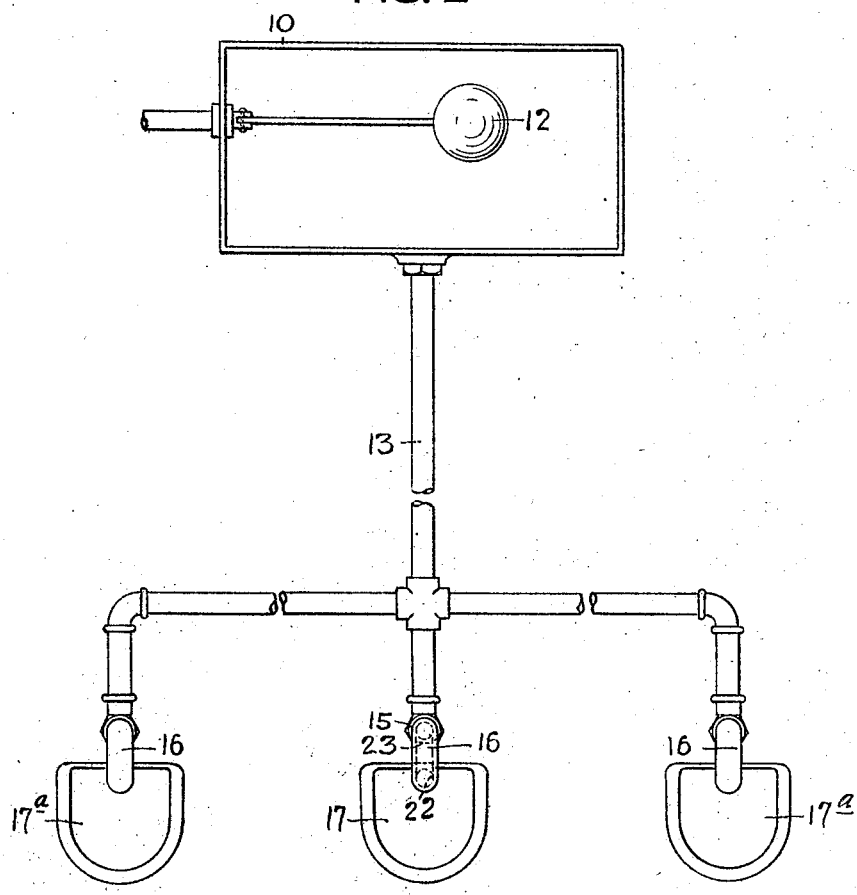

Fig. 1 is a section through the water bowl showing it attached to a feed pipe leading from a reservoir shown partly in section, and Fig. 2 is a top plan view, showing a plurality of water bowls connected to a reservoir.

Referring to the above-mentioned drawings, a main reservoir 10, the water level 11 of which is controlled by the float 12, is shown. Leading from the main reservoir is a feed pipe 13 to which a pipe 14 is attached. The upper end of the pipe 14 is threaded for receiving a coupling 15.

The water bowl includes a container 17 formed integral with an inverted U-pipe 16. One leg 22 of the U-pipe 16 extends down into the container 17. The other leg 23 of the inverted U-pipe extends downward outside of the container and has its lower end threaded at 21. As shown in Fig. 1, the cross sectional area of the upper portion of the threaded U-pipe, as shown at 24, is greater than the cross sectional area of either of the legs 22 and 23. In order to obtain efficient operation of the water bowl it is not absolutely necessary to make the cross sectional area at 24 greater than the cross sectional area of either of the legs. The water bowl will operate satisfactorily when the cross sectional area at 24 is equal to the cross sectional area of either of the legs 22 or 23. Nor is it necessary to make the water bowl in one piece since the same construction might be accomplished by making the water bowl in a plurality of pieces and carefully assembling them so as to give a similar construction to the one described above. In mounting the water bowl the leg 23 of the inverted U-pipe 16 is placed in alinement with the pipe 14 and the two are connected by means of the coupling 15 engaging the threaded portion 21 and 20 of the legs 23 and the pipe 14, respectively. The length of the pipe 14 is such that the lower wall of the bend or arch 18 is slightly below the water level 11 in the reservoir 10.

When the water bowl has been installed water from the reservoir flows into the container 17 until the water level 19 in the container 17 reaches a level slightly below the wall 18 of the inverted U-pipe. As the water rises in the leg 22 it traps air in the U-pipe and this air which collects in the chamber designated 24 is slightly compressed and forms a lock which stops the flow of the water. It will be understood that the air is compressed by reason of the head of water in the bowl, and that the water in the leg 22 will not rise to such height that it will flow over the arch 18. If the level 19 of the water in the container 17 is lowered the pressure of the air in the chamber 24 is thereby decreased, and water flows from the reservoir 10 into the container, bringing the water level 19 back to normal. Water from the container 17 cannot flow toward the reservoir 10 since the arch 18 is slightly higher than the high water level in the container.

It will be understood that extremely low pressures are involved and that the flow of water through the system is quite slow by reason of the fact that the high water level in the reservoir is but little above the normal water level of the container. Therefore the water never flows at such speed as to completely fill the space 24 in the goose-neck, so that the air is never driven out of said space. Therefore each time the water rises in the leg 22 sufficient air is present to provide the desired compression and consequent resistance to excessive rise of water in the leg 22.

I have described the construction and operation of only one of the bowls and U-pipes shown in Fig. 2. The structure and operation of the other two bowls 17ª shown therein are identical with the one above described.

From the foregoing it will be seen that not only do I prevent chaff and débris from finding its way into the system from any one bowl, but also prevent disease germs from being carried back through the goose-neck and thereafter finding their way to the other water bowls. While I have shown the inverted U-pipe attached to the bowl, it could be placed at some distance from the bowl, providing the bottom wall of the bend is located at a point slightly below the normal water level in the reservoir and above the normal water level of the bowl.

I claim as my invention:

1. The combination with a source of water supply, of a receptacle, a conduit leading from said source, an inverted U-pipe having one leg connected to the outer end of said conduit and having its other leg extending downwardly into the receptacle, the upper and lower curved walls of the bend in said U-pipe being above the normal level of water in the receptacle, and the midpoint between said upper and lower curved walls being substantially in horizontal alignment with the normal level of water at said source.

2. The combination with a source of water supply, of a receptacle, a conduit leading from said source to said receptacle, and a goose-neck in said conduit, the lower wall of said goose-neck being slightly below the normal level of the water at said source, and above the normal water level in said receptacle.

3. The combination with a source of water supply, of a receptacle, a conduit leading from said source to said receptacle, and a goose-neck in said conduit, the lower wall of said goose-neck being slightly below the normal level of the water at said source, and the upper wall of said neck being above the normal water level in said receptacle.

4. The combination with a source of water supply, of a receptacle, a conduit leading from said source to said receptacle, and a goose-neck in said conduit, the lower wall of said goose-neck being slightly below the normal level of the water at said source, and above the normal water level in said receptacle, the cross sectional area at the bend in said goose neck being greater than the cross sectional area of either of the legs leading to said bend.

In testimony whereof I, the said GUERDON A. HATTON, have hereunto set my hand.

GUERDON A. HATTON.